US012755228B1

(12) United States Patent
Elbaz et al.

(10) Patent No.: US 12,755,228 B1
(45) Date of Patent: Oct. 6, 2026

(54) GRAPH-BASED SECURITY POSTURE MANAGEMENT OF ARTIFICIAL INTELLIGENCE ASSETS

(71) Applicant: Onyx Security Ltd, Tel Aviv (IL)

(72) Inventors: Gil Elbaz, Tel Aviv (IL); Maxim Kogan, Tel Aviv (IL); Shachar Berg, Tel Aviv (IL)

(73) Assignee: Onyx Security Ltd, Tel Aviv (IL)

( * ) Notice: Subject to any disclaimer, the term of this patent is extended or adjusted under 35 U.S.C. 154(b) by 0 days.

(21) Appl. No.: 19/388,559

(22) Filed: Nov. 13, 2025

(51) Int. Cl.
*G06Q 10/0635* (2023.01)

(52) U.S. Cl.
CPC ................................ *G06Q 10/0635* (2013.01)

(58) Field of Classification Search
CPC ......... H04L 41/12; H04L 41/16; H04L 63/20; H04L 63/1433; G06Q 10/0635; G06Q 10/063; G06Q 10/06; G06Q 10/06393
See application file for complete search history.

(56) References Cited

U.S. PATENT DOCUMENTS

| | | | | |
|---|---|---|---|---|
| 8,176,019 | B2 * | 5/2012 | Brodie | G06Q 10/06 707/694 |
| 8,230,387 | B2 * | 7/2012 | Srivastava | G06T 3/40 717/136 |
| 9,311,615 | B2 * | 4/2016 | Davenport | G06Q 10/0631 |
| 10,860,721 | B1 * | 12/2020 | Gentile | H04L 63/1433 |
| 11,102,052 | B2 * | 8/2021 | Sharma | H04L 67/10 |
| 11,212,316 | B2 * | 12/2021 | Sweeney | H04L 41/0883 |
| 11,283,840 | B2 * | 3/2022 | Murray | G06Q 50/265 |
| 11,503,061 | B1 | 11/2022 | Lin et al. | |
| 11,748,458 | B2 * | 9/2023 | Sarkar | G06F 8/75 713/189 |
| 11,863,578 | B1 * | 1/2024 | Speck | G06N 5/022 |
| 12,088,599 | B1 | 9/2024 | McCarson | |
| 12,326,900 | B1 | 6/2025 | Bianchi et al. | |
| 12,363,156 | B1 * | 7/2025 | Thompson | H04L 9/3213 |
| 12,388,806 | B2 * | 8/2025 | Davis | H04L 63/20 |
| 12,418,556 | B2 * | 9/2025 | Hamdi | G06F 21/577 |
| 12,481,665 | B1 * | 11/2025 | Gargano | G06F 16/24575 |
| 12,499,329 | B2 * | 12/2025 | Shah | G06F 40/56 |

(Continued)

OTHER PUBLICATIONS

Saura, Pablo Fernandez et al., On Automating Security Policies with Contemporary LLMs (short paper) arXiv, Jun. 5, 2025 (Year: 2025).*

(Continued)

*Primary Examiner* — Scott L Jarrett
(74) *Attorney, Agent, or Firm* — M&B IP Analysts, LLC

(57) ABSTRACT

A system and method for end-to-end AI asset posture management are presented. The method includes generating a multi-dimensional graph using collected data from discovered AI assets within an enterprise environment; converting data and their relationships represented within the generated multi-dimensional graph into natural language text; performing posture analysis using data represented in the natural language text to validate an enterprise's governance policies across each of the discovered AI assets; assessing risk scores to each of the discovered AI assets based on the performed posture analysis; and identifying one or more of the discovered AI assets as being a critical risk based on their assessed risk scores.

23 Claims, 5 Drawing Sheets

(56) References Cited

U.S. PATENT DOCUMENTS

| | | | | |
|---|---|---|---|---|
| 2002/0059093 | A1 * | 5/2002 | Barton | G06Q 10/06 705/317 |
| 2003/0229525 | A1 * | 12/2003 | Callahan | G06Q 40/08 705/7.41 |
| 2004/0093408 | A1 * | 5/2004 | Hirani | H04L 41/12 709/224 |
| 2004/0260566 | A1 * | 12/2004 | King | G06Q 40/08 705/348 |
| 2006/0100958 | A1 * | 5/2006 | Cheng | G06Q 10/06312 705/38 |
| 2007/0288253 | A1 * | 12/2007 | Cobb | G06Q 30/018 705/317 |
| 2008/0015913 | A1 * | 1/2008 | Courtney | G06Q 50/26 705/7.28 |
| 2008/0033775 | A1 * | 2/2008 | Dawson | G06Q 10/00 705/7.28 |
| 2008/0082609 | A1 | 4/2008 | O'Sullivan et al. | |
| 2008/0221944 | A1 * | 9/2008 | Kelly | G06Q 50/00 705/7.28 |
| 2009/0319312 | A1 * | 12/2009 | Moerdler | G06Q 10/0635 705/7.36 |
| 2010/0324952 | A1 * | 12/2010 | Bastos | G06Q 30/018 705/317 |
| 2011/0055119 | A1 * | 3/2011 | Sengupta | G06Q 99/00 705/500 |
| 2014/0129457 | A1 * | 5/2014 | Peeler | G06Q 30/018 705/317 |
| 2014/0137257 | A1 * | 5/2014 | Martinez | H04L 63/1433 726/25 |
| 2016/0012235 | A1 * | 1/2016 | Lee | G06F 21/6218 726/25 |
| 2016/0366080 | A1 | 12/2016 | Bastide et al. | |
| 2017/0126712 | A1 | 5/2017 | Crabtree et al. | |
| 2017/0330197 | A1 | 11/2017 | Dimaggio et al. | |
| 2017/0357502 | A1 * | 12/2017 | Barday | G06Q 10/06 |
| 2018/0191730 | A1 | 7/2018 | Deters et al. | |
| 2018/0268318 | A1 | 9/2018 | Matam et al. | |
| 2018/0285887 | A1 * | 10/2018 | Maung | G06Q 30/018 |
| 2019/0207981 | A1 * | 7/2019 | Sweeney | H04L 41/145 |
| 2019/0355060 | A1 | 11/2019 | Collins et al. | |
| 2021/0211472 | A1 * | 7/2021 | Murray | G06N 20/20 |
| 2021/0216928 | A1 * | 7/2021 | O'Toole | G06F 16/29 |
| 2021/0326411 | A1 * | 10/2021 | Sarkar | G06F 21/577 |
| 2021/0334386 | A1 * | 10/2021 | AlGhamdi | H04L 63/1433 |
| 2021/0335367 | A1 | 10/2021 | Graff et al. | |
| 2021/0374767 | A1 * | 12/2021 | Kurian | G06Q 10/10 |
| 2022/0050828 | A1 | 2/2022 | Wu et al. | |
| 2022/0188717 | A1 * | 6/2022 | Daley | H04L 9/3247 |
| 2022/0366332 | A1 * | 11/2022 | Duessel | G06Q 10/0635 |
| 2022/0407883 | A1 | 12/2022 | Rao et al. | |
| 2023/0061234 | A1 * | 3/2023 | Calado | G06F 21/577 |
| 2023/0113332 | A1 | 4/2023 | Crabtree et al. | |
| 2023/0208882 | A1 * | 6/2023 | Crabtree | H04L 63/1408 726/22 |
| 2023/0269272 | A1 | 8/2023 | Dambrot et al. | |
| 2023/0283521 | A1 * | 9/2023 | Berger | H04L 63/20 709/223 |
| 2023/0308474 | A1 | 9/2023 | Thompson | |
| 2023/0315764 | A1 | 10/2023 | Kumar et al. | |
| 2023/0328095 | A1 | 10/2023 | Chesla et al. | |
| 2024/0163304 | A1 * | 5/2024 | Gupta | H04L 63/1433 |
| 2024/0223587 | A1 | 7/2024 | Berger et al. | |
| 2024/0314158 | A1 * | 9/2024 | Bourzikas | H04L 63/1441 |
| 2024/0348664 | A1 * | 10/2024 | Mohanram | H04L 63/20 |
| 2024/0411867 | A1 * | 12/2024 | Sakazi | G06F 21/577 |
| 2024/0420161 | A1 * | 12/2024 | Shah | G06Q 10/0635 |
| 2024/0422187 | A1 * | 12/2024 | Shah | G06F 40/56 |
| 2025/0005488 | A1 * | 1/2025 | Meline, Jr. | G06Q 10/06375 |
| 2025/0047701 | A1 * | 2/2025 | Siddam | H04L 41/22 |
| 2025/0063083 | A1 * | 2/2025 | Grinberg | G06Q 10/06393 |
| 2025/0156303 | A1 | 5/2025 | Stevens | |
| 2025/0200290 | A1 | 6/2025 | Birru et al. | |
| 2025/0247414 | A1 | 7/2025 | Baragaba et al. | |
| 2025/0317464 | A1 | 10/2025 | Mehrotra et al. | |
| 2025/0335598 | A1 | 10/2025 | Charles et al. | |
| 2025/0358296 | A1 | 11/2025 | Ray et al. | |
| 2025/0377864 | A1 * | 12/2025 | Dangi | G06F 8/33 |
| 2025/0378178 | A1 | 12/2025 | Pettingill | |
| 2025/0384374 | A1 * | 12/2025 | Ohashi | G06Q 10/0635 |
| 2025/0390352 | A1 * | 12/2025 | Crabtree | G06F 9/5027 |
| 2026/0017386 | A1 | 1/2026 | Ohayon et al. | |
| 2026/0039674 | A1 | 2/2026 | Siekman et al. | |
| 2026/0081939 | A1 | 3/2026 | Boyer | |

OTHER PUBLICATIONS

Keller, Brandon, AI Security Posture Management (AI-SPM): What it is and How it Works Forcepoint, Apr. 18, 2025 (Year: 2025).*

Kundu, Rohit, Comprehensive Guie to Large Language Model (LLM) Security Lakera, May 21, 2025 (Year: 2025).*

Artificial Intelligence Risk & Governance Wharton, University of Pennsylvania, Jan. 11, 2023 (Year: 2023).*

Simplify Custom Posture Rule Creation with Upwind's LLM-based Rego Support Upwind.io, 2025 (Year: 2025).*

Estalishing a Governance Framework for AI-Powered Applications PaloAlto Networks, Cortex Cloud, White Paper, (Year: 2025).*

Artificial Intelligence Risk Management Framework: Generative Artificial Intelligence Profile National Institute of Standards and Technology, NIST, Jul. 2024 (Year: 2024).*

Milovanovic, Miroslav, Primer: AI Security Posture Management (AI-SPM) Knostic, 2025 (Year: 2025).*

LLM Security for Enterprises: Risks and Best Practices Wiz Experts Team, Wiz, Oct. 12, 2025 (Year: 2025).*

What is AI-SPM (AI Security Posture Management)? SentinelOne, Sep. 3, 2025 (Year: 2025).*

Streamline AI Governance with Informatic Informatica, eBook, 2025 (Year: 2025).*

Poter, Alexis, AI SPM: AI Security Posture Management Big. ID Next, Sep. 23, 2025 (Year: 2025).*

Alkady et al., "Pentora: an Integrated Framework for Automated Web and Network Vulnerability Assessment," 2025 Intemational Mobile, Intelligent, and Ubiquitous Computing Conference (MIUCC) Year: 2025 | Conference Paper | Publisher: IEEE.

Chandel et al., "Endpoint Protection: Measuring the Effectiveness of Remediation Technologies and Methodologies for Insider Threat," 2019 Intemational Conference on Cyber-Enabled Distributed Computing and Knowledge Discovery (CyberC) Year: 2019 | Conference Paper | Publisher: IEEE.

* cited by examiner

GRAPH-BASED SECURITY POSTURE MANAGEMENT OF ARTIFICIAL INTELLIGENCE ASSETS

TECHNICAL FIELD

This disclosure relates, generally, to the field of computing, particularly, to cybersecurity and artificial intelligence (AI), and more particularly, to end-to-end AI asset posture management.

BACKGROUND

Artificial intelligence (AI) technologies have rapidly proliferated within enterprise environments, supporting various business-critical functions, such as analytics, automation, decision-making operations, and content generation. Modern enterprise environments routinely deploy numerous AI assets, such as large language models, machine learning pipelines, predictive engines, and generative AI applications, across hybrid infrastructures that span on-premises systems, cloud environments, and third-party platforms. These assets may be embedded in internal software, integrated via third-party APIs, or consumed through external service providers.

While these AI assets enable substantial business value, as AI becomes embedded throughout enterprise ecosystems, organizations face growing challenges in maintaining proper security and operational posture for these assets. Each AI system introduces unique dependencies, data flows, and behavioral characteristics, which differ substantially from traditional information technology (IT) assets. For example, AI models often rely on private or sensitive data during training, and are regularly updated with current information to improve performance, and provide prediction interfaces that can be accessed by both internal and external users. These attributes, as well as others, introduce novel risks, including the potential for model drift, unauthorized data access, prompt injection, adversarial manipulation, and misuse of generative capabilities.

Currently, existing AI governance tools focus primarily on model explainability, fairness, or documentation, without offering real-time visibility into security controls, data lineage, model integrity, or access policies. Additionally, traditional and compliance frameworks, designed for conventional network and endpoint assets, are insufficient to assess and manage the dynamic risk profiles of AI systems. As a result, organizations often lack the ability to continuously monitor the posture of their AI assets, for example, their security configuration, compliance alignment, and operational health. Moreover, the absence of unified AI posture management leaves organizations vulnerable to misconfigurations, policy violations, and latent security exposures across their distributed AI assets. Furthermore, the rapid pace of model updates, API integrations, and evolving regulatory requirements exacerbates the difficulty of maintaining a consistent security baseline. Thus, there exists a need for an implementation of end-to-end AI asset posture management that is capable of continuously evaluating the configuration, usage, and risk state of all AI assets across an enterprise environment, by autonomously identifying vulnerabilities, assessing compliance against defined policies and governance, and providing actionable insights to allow for the implementation of automated remediations to maintain a secure and complaint AI ecosystem.

Therefore, it would be advantageous to provide an efficient solution that would cure the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key nor critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by a data processing apparatus, cause the apparatus to perform the actions.

In one general aspect, the method may include generating a multi-dimensional graph using collected data from discovered AI assets within an enterprise environment. The method may also include converting data and their relationships represented within the generated multi-dimensional graph into natural language text. The method may furthermore include performing posture analysis using data represented in the natural language text to validate an enterprise's governance policies across each of the discovered AI assets; assessing risk scores to each of the discovered AI assets based on the performed posture analysis; and identifying one or more of the discovered AI assets as being a critical risk based on their assessed risk scores. Other embodiments of this aspect include corresponding computer systems, apparatus, and computer programs recorded on one or more computer storage devices, each configured to perform the actions of the methods.

Implementations may include one or more of the following features.

The method where the generated multi-dimensional graph visualizes relationships among the discovered AI assets and integrates encodings of each discovered AI asset's security and compliance posture.

The method where a discovered AI asset's security and compliance posture may include connected data, connected tools, connected AI agents, access channels, and configuration parameters.

The method where converting of the data and their relationships represented within the generated multi-dimensional graph into natural language text is performed, at least in part, using a large language model (LLM). The method where the enterprise's governance policies include an enterprise's deterministic rule-set policies and an enterprise's large language model (LLM)-based policies.

The method where validating of the enterprise's deterministic rule-set policies is performed, at least in part, using a deterministic rules engine. The method where validating of the enterprise's LLM-based policies is performed, at least in part, using a reasoning model.

The method where the multi-dimensional graph is generated, at least in part, using a graph-based model.

The method where an AI asset may include any one of: a tool, a data source, or an other AI asset.

The method where the performed posture analysis reveals one or more security risks and/or one or more compliance risks based on any one of: misconfigurations, overexposed connections, ungoverned data flows, policy violations, risky tool combinations, and open channels.

The method where generating the multi-dimensional graph may include encoding the collected data through both visual and non-visual representations. Implementations of the described techniques may include hardware, a method or process, or a computer tangible medium.

In one general aspect, the system may include one or more processors configured to: generate a multi-dimensional graph using collected data from discovered AI assets within an enterprise environment. The system may furthermore convert data and their relationships represented within the generated multi-dimensional graph into natural language text. The system may perform posture analysis using data represented in the natural language text to validate an enterprise's governance policies across each of the discovered AI assets. The system may moreover assess risk scores to each of the discovered AI assets based on the performed posture analysis. The system may also identify one or more of the discovered AI assets as being a critical risk based on their assessed risk scores. Other embodiments of this aspect include corresponding computer systems, apparatus, and computer programs recorded on one or more computer storage devices, each configured to perform the actions of the methods.

Implementations may include one or more of the following features.

The system where the generated multi-dimensional graph visualizes relationships among the discovered AI assets and integrates encodings of each discovered AI asset's security and compliance posture.

The system where a discovered AI asset's security and compliance posture may include connected data, connected tools, connected AI agents, access channels, and configuration parameters.

The system where converting of the data and their relationships represented within the generated multi-dimensional graph into natural language text is performed, at least in part, using a large language model (LLM).

The system where the enterprise's governance policies include an enterprise's deterministic rule-set policies and an enterprise's large language model (LLM)-based policies.

The system where validating of the enterprise's deterministic rule-set policies is performed, at least in part, using a deterministic rules engine.

The system where validating of the enterprise's LLM-based policies is performed, at least in part, using a reasoning model.

The system where the multi-dimensional graph is generated, at least in part, using a graph-based model.

The system where an AI asset may include any one of: a tool, a data source, or an other AI asset.

The system where the performed posture analysis reveals one or more security risks and/or one or more compliance risks based on any one of: misconfigurations, overexposed connections, ungoverned data flows, policy violations, risky tool combinations, and open channels.

The system where the one or more processors, when generating the multi-dimensional graph, are configured to encode the collected data through both visual and non-visual representations. Implementations of the described techniques may include hardware, a method or process, or a computer tangible medium.

In one general aspect, the non-transitory computer-readable medium may include one or more instructions that, when executed by one or more processors of a device, cause the device to: generate a multi-dimensional graph using collected data from discovered AI assets within an enterprise environment; convert data and their relationships represented within the generated multi-dimensional graph into natural language text; perform posture analysis using data represented in the natural language text to validate an enterprise's governance policies across each of the discovered AI assets; assess risk scores to each of the discovered AI assets based on the performed posture analysis; and identify one or more of the discovered AI assets as being a critical risk based on their assessed risk scores. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings. In the drawings:

DETAILED DESCRIPTION

Figure 1:
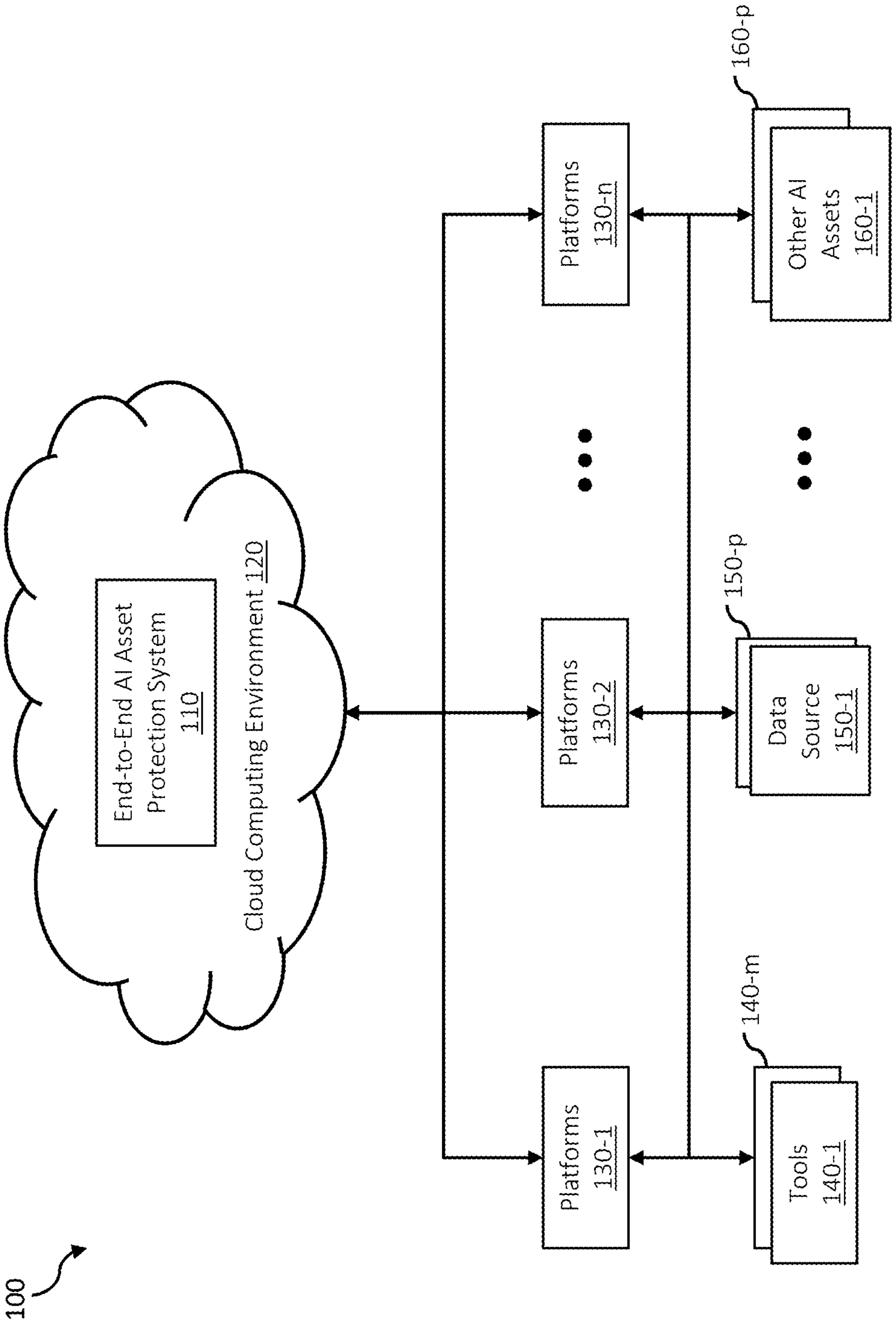
FIG. 1 illustrates an example network diagram utilized to describe various embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments present a method and system for end-to-end AI asset posture management. The method and system can perform AI asset posture management, thereby enabling the detection of security and compliance risks of AI assets across an enterprise network, regardless of their deployment origin, location, or operational status. Also, the method and system can generate a multi-dimensional graph using collected data from AI assets, thereby enabling traversal and risk inference. Additionally, the method and system can validate governance policies across the AI assets to ensure alignment with the enterprise's governance policies, thereby enabling the determination of security and compliance risks. Moreover, the method and system can assess risk scores to AI assets, indicating if an AI asset requires remediation, thereby helping enterprises reduce systematic risk by isolating weak links and directing enforcement across the enterprise network.

The disclosed embodiments are operable for any computing architecture and should not be limited to any one architecture discussed herein below.

The disclosed method is not a mental process and cannot be performed entirely in the human mind. Rather, the method involves technical operations that are executed within a computing environment and are tied to specific technological implementations. For example, the method includes dynamically integrating with all platforms in an enterprise environment, asynchronously extracting data about all the platforms within the enterprise environment, and autonomously and continuously assessing and detecting security risks of all discovered AI assets deployed across the enterprise environment.

The operation and effectiveness of the method depend on a variety of technical factors, including the number and type of platforms, tools, data sources, AI agents, and other AI assets, within an enterprise environment. The method may dynamically modify its operation based on both the number and types of platforms, tools, data sources, AI agents, and other AI assets, within an enterprise environment, as well as the data that is collected about the AI assets. Such dynamic actions require the use of algorithmic decision-making, network analysis tools, and data processing capabilities, which cannot be mentally performed by a human operator.

Moreover, although a human operator may supply a system prompt and training data to the end-to-end AI asset protection system, the execution of the method remains rooted in automated processing by computing systems. It should be noted that the operator's input may inherently influence certain actions the end-to-end AI asset protection system takes, but the operational steps involved in carrying out the method are performed by the system.

Accordingly, the disclosed method is directed to a practical application of computer technology to solve a specific problem in the fields of cybersecurity and artificial intelligence (AI). It improves the ability to supervise, protect, and govern AI agents and their connected tools and resources within enterprise environments by offering end-to-end posture management of AI assets through technical mechanisms that are necessarily rooted in computing technology.

FIG. 1 illustrates an example network diagram utilized to describe the various disclosed embodiments.

The network diagram 100, also referred to as computing environment 100 or enterprise environment 100, illustrated in FIG. 1 includes an end-to-end AI asset protection system 110, cloud computing environment 120, platforms 130-1, 130-2, **130-*n* (hereinafter, platform 130 in the singular or platforms 130 in the plural), tools 140-1, 140-*m* (hereinafter, tool 140 in the singular or tools 140 in the plural), data sources 150-1, 150-*p* (hereinafter, data source 150 in the singular or data sources 150 in the plural), and other AI assets 160-1, 160-*p* (hereinafter, other AI asset 160 in the singular or other AI assets 160** in the plural), all connected to a network (not shown for purposes of simplicity).

In at least one embodiment, cloud computing infrastructure (not shown for purposes of simplicity) is implemented on the network, and the cloud computing environment 120 is implemented/deployed on top of the cloud computing infrastructure. For example, in an embodiment, cloud computing infrastructure is from one cloud computing provider, such as Amazon® Web Services (AWS), Google® Cloud Services (GCS), Microsoft® Azure, Oracle Cloud®, IBM cloud®, and the like. In at least one embodiment, a cloud computing environment 120 may be deployed in various configurations including, but not limited to, public, private, hybrid, or edge-based configurations. In an embodiment, a cloud computing environment 120 is a virtual private cloud (VPC), a virtual network (VNet), a virtual private network (VPN), a combination thereof, and the like. In at least one embodiment, the cloud computing environment 120 is a heterogeneous cloud environment. In at least one embodiment, the end-to-end AI asset protection system 110 is located/hosted on the cloud computing environment 120.

Platforms 130 are software environments, containing a plurality of AI assets, which provide tools, infrastructure, and frameworks to train, deploy, and manage AI applications and models. Platforms 130 are located in various locations within the enterprise environment 100. Platforms 130 can be AI platforms, such as Platform as a Service (PaaS), for example, Azure®, and Software as a Service (Saas), for example SALESFORCE® customer relationship management (CRM) systems, internally developed AI platforms, such as Infrastructure as a Service, (IaaS), for example, AWS® and WIZ®, and third-party AI platforms, such as a system developed and maintained by an external organization, for example, CLAUDE®. More specifically, platforms 130 can include one or more data platforms, cloud platforms, security platforms, AI agent platforms, integration and middleware platforms, application platforms, AI and machine learning platforms, collaboration and productivity platforms, business platforms, and the like, or any combination thereof.

Each platform 130 contains a plurality of AI assets (not explicitly shown in FIG. 1), that are connected to one or more tools 140, one or more data sources 150, and one or more other AI assets 160, or any combination thereof. In at least one embodiment, AI assets can include other AI assets not explicitly named or depicted in FIG. 1.

Tools 140, such as native tools, MCP tools, and API tools, are software components, frameworks, and utilities that enable the creation, training, deployment, interactions, and management of AI systems, for example, GMAIL and SLACK®. Tools 140 can include data management tools, model development tools, infrastructure and compute tools, model deployment and serving tools, security, governance, and compliance tools, AI application layer tools, and the like.

Data sources 150 are repositories from which information is collected, accessed, or generated for use in training, test, and operating AI systems, such as web extensions, for example, CHROME® and MICROSOFT EDGE®, existing security stacks, CROWDSTRIKE®, analytics platforms, for example, DATABRICKS®, and databases, for example, SNOWFLAKE®, and the like.

Other AI assets 160 are any component used in the development, deployment, or operation of an AI system, besides tools 140 and data sources 150. Specifically, other AI assets 160 include autonomous or semi-autonomous computational entities, i.e., AI agents, configured to perform one or more cognitive, analytical, or generative tasks through the application of machine learning, reasoning, or other artificial intelligence techniques, as well as tools or resources that use AI to perform a specific function, such as data assets, for example, data pipelines and associated data structures, platform/software and infrastructure assets, for example, data storage systems and development platforms, executable code, one or more trained machine learning models, operational logic enabling perception, inference, decision-making, and action within a defined environment, and the like. The other AI assets 160 may further include capabilities for self-adaptation, goal-oriented behavior, and interaction with additional AI assets or external systems via defined interfaces or communication protocols. In certain embodiments, the other AI assets 160 may operate independently or as part of a multi-agent system, wherein a plurality of AI assets cooperate, compete, or coordinate to achieve complex objectives. Each other AI asset 160 may encapsulate specialized functions, such as language understanding, reasoning, planning, control, or prediction, and may maintain a persistent state or memory reflective of its operational context.

As used herein, the terms "AI asset," in the singular, and "AI assets," in the plural, include tools 140, data sources 150, and other AI assets 160.

End-to-end AI asset protection system 110, also referred to as system 110, is an agentic AI system, i.e., a class of AI systems configured to monitor, govern, and, if needed, intervene in the behavior of other AI agents/assets, effectively acting as an oversight, alignment, and safety layer in agentic AI ecosystems. System 110 assesses the posture of each AI asset within an enterprise environment to detect potential security or compliance risks and dynamically enforce an enterprise's governance policies.

System 110 is configured to collect data from platforms 130 through various connections, as described below. The system 110 can ingest data, such as metadata, runtime data, and configuration and system data, from platforms 130 through various read-only integrations, telemetry, and the like. Runtime data includes active, or content-level, data generated in real time, for example, messages, documents, chat transcripts, event payloads, and the like. Metadata includes structured data about the runtime content, for example, message IDs, timestamps, sender names, file names, owners, modification dates, calendar event times, and the like. Configuration data includes settings that define how an application or system behaves, for example, integration settings, workflow definitions, API keys, schema info, and the like. System data includes operational data generated by the system itself, for example, caches, temporary files, backups, and the like.

In at least one embodiment, system 110 is connected to AI platforms 130 using integrations via application programming interfaces (APIs). In at least one embodiment, system 110 is connected to internally developed AI platforms 130 through a gateway layer using a software development kit (SDK) or proxy. In at least one embodiment, system 110 is connected to third party AI platforms 130 through a model context protocol (MCP) gateway using a proxy.

In at least one embodiment, system 110 is realized as an MCP server, and AI platforms 130 are realized as MCP clients.

System 110 is further configured to assess the posture of each AI asset discovered within an enterprise environment 100 to detect potential security risks. Specifically, in an embodiment, system 110 invokes a posture management engine (not shown in FIG. 1) to analyze, represent, and manage, the security and compliance postures of each AI asset based on their configurations, permissions, data access, and connectivity. System 110 can model the posture of each AI asset, including their connected data sources and tools, access channels, e.g., APIs, messaging platforms, public endpoints, and configuration parameters, e.g., system prompts, credentials, and accessibility. Additionally, system 110, during posture modeling, can generate a multi-dimensional graph linking AI assets, such as AI agents, tools, data sources, and user interfaces, thus enabling traversal and risk inference, e.g., what data or tools are exposed through which AI assets and to which channels. Also, system 110 can validate, using various machine learning models and engines, an enterprise's governance policies across discovered AI assets, identifying any security and compliance risks and ensuring consistent/continuous alignment with the enterprise's governance policies. Moreover, system 110 can compute and assess a risk score for/to each discovered AI asset using analyzed collected data and the generated multi-dimensional graph, and can determine if an AI asset presents/is a critical risk based on its assessed risk score.

Embodiments performed by system 110 and its modules and layers (not shown in FIG. 1) are discussed in more detail below. The modules of the end-to-end AI asset protection system 110 can be implemented in software (as defined herein below), firmware, hardware, or any combination thereof. Such implementations may vary depending on performance requirements, computational constraints, deployment contexts (e.g., edge vs. cloud), or other architectural considerations. It should be understood that various embodiments discussed herein are presented for purposes of illustration and description, and that the disclosed embodiments should not be limited to any one or more embodiments discussed herein.

It should be noted that although one end-to-end AI asset protection system 110 is illustrated in FIG. 1 for the sake of simplicity, the embodiments disclosed herein can be applied to a plurality of instances of the end-to-end AI asset protection system 110 per enterprise.

Figure 2:
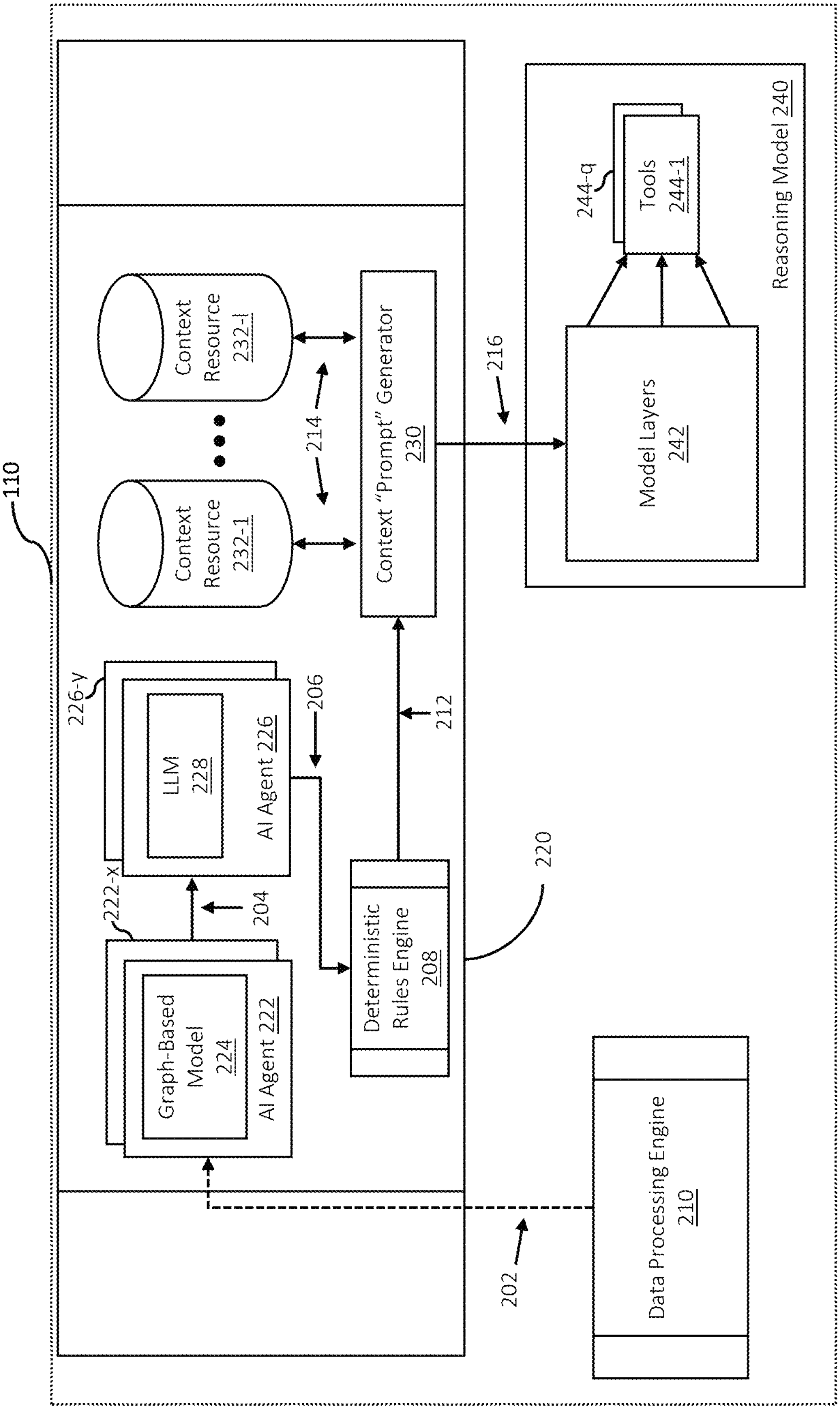
FIG. 2 is a functional diagram of an end-to-end AI asset protection system according to at least one embodiment.

FIG. 2 is an example functional diagram of the end-to-end AI asset protection system 110 according to an embodiment. As illustrated in FIG. 2, the end-to-end AI asset protection system 110 can include, but is not limited to, data processing engine 210, posture management engine 220, and reasoning model 240. The reasoning model 240 can include model layers 242 and tools 244-1, **244-*q* (hereinafter, tool 244 in the singular or tools 244** in the plural).

Data processing engine 210 is a computation component of system 110 that ingests raw data, i.e., data that has been collected but not yet processed, cleaned, or analyzed, received from both internal and external data sources, executes operations on the data, such as filtering, sorting, and aggregating, to prepare the data for analysis, and orchestrates the data respectively downstream to posture management engine 220 for analysis. Additionally, data processing engine 210 stores data, such as previously processed collected data. Collected data can be data representing AI assets, such as an asset's identity, description, system prompt, connected tools 140, connected data sources 150, connected AI assets 160, and access controls, e.g., public/private, authenticated, communication channels, e.g., Microsoft Teams®, WhatsApp®, API endpoints.

Posture management engine 220 can be a reasoning engine. Posture management engine 220 is configured (e.g., trained) to perform "posture management". Posture management includes conducting posture analysis to ensure that an enterprise's governance policies, specifically deterministic rule-set policies, and LLM-based policies, are effectively applied across each discovered AI asset within an enterprise environment 100 (FIG. 1). Posture analysis can include generating a multi-dimensional graph that models the enterprise environment 100, enabling comprehensive evaluation of the posture data it represents, and identifying security and compliance risks through in-depth analysis.

An enterprise's governance policies establish the strategic, procedural, and operational framework that ensures an enterprise's information systems and digital assets are protected while aligning with business goals and regulatory obligations. Specifically, the enterprise's governance policies are defined to align security initiatives, define accountability for cybersecurity management and decision-making, ensure compliance with applicable standards and regulations, and protect data and systems from both internal and external threats. Enterprise governance policies can be derived from within system 110, pulled from one or more external sources, or even derived from information uploaded to system 110, such as one or more documents, using the reasoning model 240. An enterprise's governance policies can include both deterministic rule-set policies and LLM-based policies. Deterministic rule-based policies are controls that operate by explicit "if/then" rules, for example, "No public-facing AI agents within the enterprise environment." LLM-based policies are policies that are themselves interpreted, generated, or enforced by large language models (LLMs), i.e., adaptive, context-aware, probabilistic rulesets rather than the static, deterministic "if/then" controls, for example, "AI agents are not allowed to access a certain category of websites."

The posture management engine 220 can include AI agents 222, 222-*x*, hosting one or more trained machine learning models 224, such as one or more trained graph-based models 224 (hereinafter, AI agents 222 in the singular or AI agents 222 in the plural), AI agents 226, 226-*y*, hosting one or more trained machine learning models 228, such as one or more trained large language models (LLMs) 228 (hereinafter, AI agent 226 in the singular or AI agents 226 in the plural), deterministic rules engine 208, a context "prompt" generator 230, and context resources 232-1, 232-1 (hereinafter, context resource 232 in the singular or context resources 232 in the plural). Additionally, AI agents 222, 226 include tools (not shown for purposes of simplicity).

The trained graph-based models 224, herein referred to as graph-based model 224, can be a graph neural network (GNN) that, through training, can generate multi-dimensional graphs representing data across multiple dimensions, such as encoded visually, i.e., the relationships between AI assets, and encoded non-visually, i.e., integrating underlying encodings of the posture of each of the AI assets.

The trained LLMs 228, herein referred to as LLM 228, can be an LLM that, through training, can transform the data and relationships represented within a multi-dimensional graph into natural language text. The LLM 228 can be trained on extensive corpora of text data using unsupervised, supervised, or reinforcement learning techniques. Examples include encoder-only architectures (e.g., BERT-type models), decoder-only architectures (e.g., GPT-type models), or encoder-decoder architectures (e.g., T5-type or BART-type models).

The context "prompt" generator 230 is a component that creates or refines prompts, i.e., the text inputs that guide how a model produces its responses. Specifically, the context "prompt" generator 230 assists system 110 in generating the best possible instruction(s) before passing data to reasoning model 240. Context resources 232 include internal sources, such as enterprise-specific sources, and external information sources, such as up-to-date public information from the internet.

Figure 4:
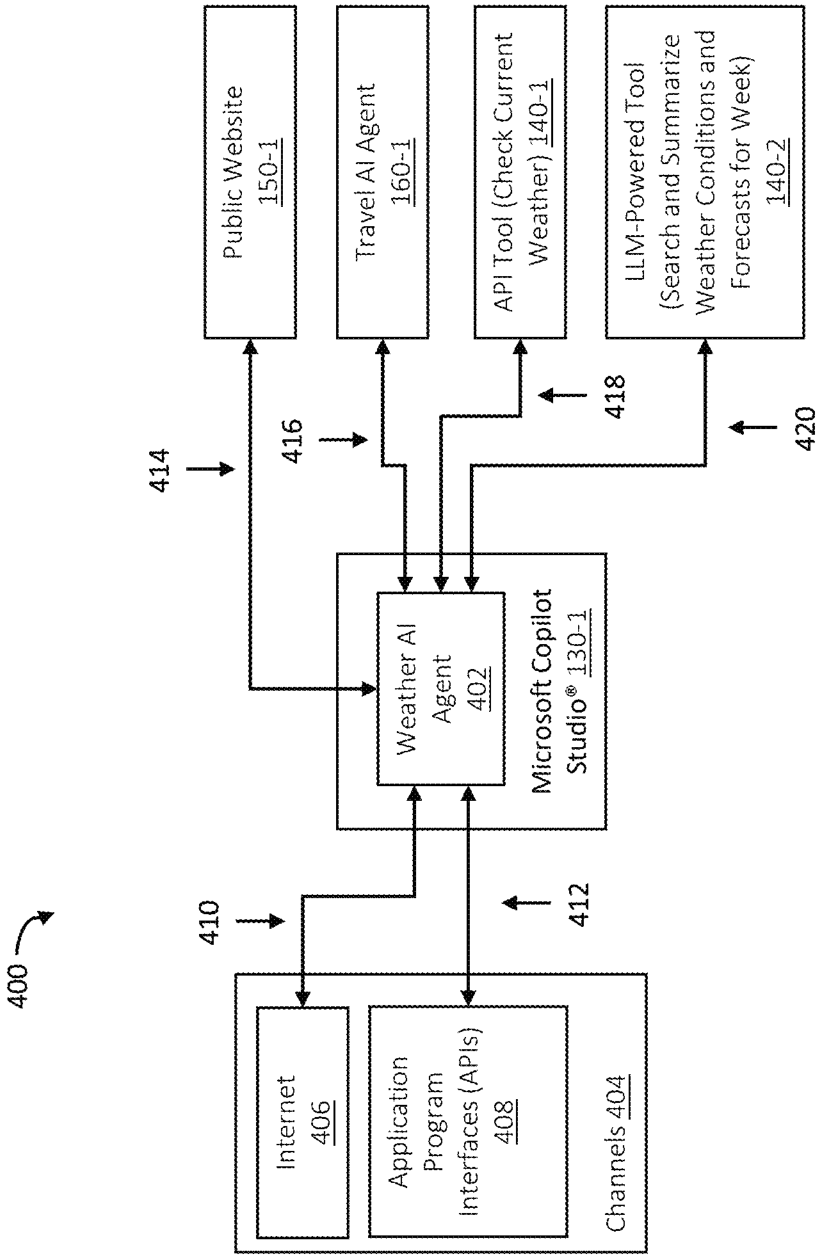
FIG. 4 illustrates a visual representation of an example multi-dimensional graph according to at least one embodiment.

AI agent 222 can receive 202 processed collected data from the data processing engine 210. Upon receiving the processed collected data, the AI agent 222, using its trained graph-based model 224, generates a multi-dimensional graph (not shown in FIG. 2), i.e., models the posture of each of the discovered AI assets represented in the processed collected data. The generated multi-dimensional graph can both visually depict the relationships between the AI assets represented in the processed collected data, as illustrated in FIG. 4, and integrate underlying encodings of the posture of each of the AI assets within the graph, thus forming a security posture model. As follows, the terms 'multi-dimensional graph' and 'security posture model' are used interchangeably.

FIG. 4 illustrates a visual representation of an example multi-dimensional graph 400 according to at least one embodiment. The example multi-dimensional graph 400 includes seven (7) nodes 402, 140-1, 140-2, 150-1, 160-1, 406, and 408, and six (6) edges 140-1, 104-2, 150-1, 160-1, 406, and 408. Specifically, the nodes 402, 140-1, 140-2, 150-1, 160-1, 406, and 408, in the multi-dimensional graph 400 can represent the AI assets within enterprise environment 100, such as an AI agent, for example, weather AI agent 402, within a platform, for example, Microsoft Copilot Studio® 130-1, tools, for example, API tool 140-1 and LLM-powered tool 140-2, data sources, for example, public website 150-1, other connected AI agents, for example, travel AI agent 160-1, and access channels 404, for example, internet 406, application program interfaces (APIs) 408, public endpoints (not shown), or messaging platforms (not shown). The edges 410, 412, 414, 416, 418, and 420, in the multi-dimensional graph 400, can represent the relationships between the AI assets, for example, data flow, API calls, trust links, and policy dependencies. Additionally, labels (not shown for purposes of simplicity) or attributes (not shown for purposes of simplicity) can be depicted, representing security metadata, such as trust level, confidentiality, and control strength. Also, each edge 140-1, 104-2, 150-1, 160-1, 406, and 408, can be annotated with information, such as allowed data types, for example, text or embeddings, trust level, for example, internal or external, policy enforcement, for example, deterministic rule-set or LLM-based moderation, or threat risk, for example, low, medium, or high. Moreover, the multi-dimensional graph 400 includes underlying encodings of the posture of each of the AI assets within the graph. The encodings can include information such as threat context, for example, what can go wrong regarding each AI asset/access channel, control objectives, for example, what rule-set or LLM-based policies defend each AI asset, residual risk and monitoring mechanisms, and configuration parameters, for example, system prompts, credentials, and accessibility.

The AI agent 222 can feed 204 the generated security posture model to AI agent(s) 226. Upon receiving the security posture model, the AI agent 226 can process the model through its LLM 228 to generate a textual description of the graph, i.e., convert its data and relationships into natural language text.

The AI agent 226 can feed 206 the generated textual description of the graph into the deterministic rules engine 208. The deterministic rules engine 208 can be a reasoning engine. The deterministic rules engine 208 is configured (e.g., trained) to perform posture analysis to validate the enterprise's deterministic rule-set policies across the discovered AI assets represented within the security posture model.

The deterministic rules engine 208 can feed 212 the results of the deterministic rule-set validation and further feed the textual description of the graph into the context "prompt" generator 230. Upon receiving the input, the context" prompt" generator 230 queries 214 one or more context resources 232 to access information, such as information learned through historical data or learned information through the most recent analyzed data, needed to generate contextually relevant prompts corresponding to validating LLM-based policies across the discovered AI assets represented within the security posture model to ensure alignment with the enterprise's governance policies. Using information pulled 214 from the context resources 232, along with a pre-defined system prompt, the context "prompt" generator 230 generates a contextually relevant prompt, for example, "Based on the generated security posture model, ensure that the enterprise's LLM-based policies governing interactions with AI assets are not violated by the discovered AI assets." The context "prompt" generator 230 feeds 216 the generated prompt, the textual representation of the multi-dimensional graph, and the results of the deterministic rule-set validation, to the reasoning model 240 for processing.

The trained reasoning model 240, herein referred to as reasoning model 240, can be a trained language model, such as a trained LLM. Model layers 242 can include the layers of the reasoning model 240, such as a perception layer, memory layer, reasoning layer, and an orchestration layer. In an embodiment, a language model may include various types and architectures, each configured to process, generate, or analyze natural language data. Such models can include, without limitation, statistical language models (e.g., n-gram models, hidden Markov models), neural network-based models (e.g., recurrent neural networks, long short-term memory (LSTM) networks, gated recurrent units (GRUs)), and transformer-based models that employ self-attention mechanisms. In certain embodiments, the language model may comprise a large language model (LLM) trained on extensive corpora of text data using unsupervised, supervised, or reinforcement learning techniques. Examples include encoder-only architectures (e.g., BERT-type models), decoder-only architectures (e.g., GPT-type models), or encoder-decoder architectures (e.g., T5-type or BART-type models). The system may further incorporate multimodal language models capable of processing both textual and non-textual data (e.g., images, audio, or structured data), or domain-specific language models fine-tuned for specialized applications such as legal, medical, or technical content analysis.

The reasoning model 240 may be implemented using a variety of computational architectures and frameworks designed to perform logical inference, problem solving, or decision-making based on structured or unstructured data. Such models can include, without limitation, symbolic reasoning systems (e.g., rule-based engines, knowledge graphs, expert systems), probabilistic reasoning models (e.g., Bayesian networks, Markov logic networks, probabilistic graphical models), and neural reasoning models that utilize deep learning architectures to approximate logical relationships. In certain embodiments, the reasoning model 240 may employ neuro-symbolic approaches that integrate neural networks with symbolic reasoning components to achieve explainable and generalizable inference. The reasoning model 240 may further include chain-of-thought, program-of-thought, or retrieval-augmented reasoning mechanisms configured to generate intermediate logical steps or to incorporate external knowledge sources dynamically during inference. Additionally, hybrid reasoning frameworks may combine statistical inference with deterministic rule evaluation to enhance robustness, interpretability, and adaptability across diverse application domains.

Additionally, graph-based model 224, and LLM 228, may be implemented using the variety of computational architectures and frameworks, as described above.

The reasoning model 240 is configured to receive contextually relevant prompts. The reasoning model 240 is further configured (i.e., trained, fine-tuned, and validated) to execute the prompt to generate an internal thought state that encapsulates context, goals, and possible actions. Based on the generated internal thought state, the reasoning model 240 determines an action or action sequence intended to be performed by system 110. The actions may involve calling tools 244. When calling a tool 244, the reasoning model 240 is configured to generate a structured call, e.g., JSON, that includes parameters describing the action to be performed.

The reasoning model 240 is further configured to process a system prompt, a generated contextually relevant prompt, derived posture information, and the textual representation of the generated multi-dimensional graph, to further perform posture analysis to validate the enterprise's LLM-based policies across the discovered AI assets represented within the security posture model. Additionally, the reasoning model is further configured to analyze the results of the performed validations of the deterministic rule-set policies and LLM-based policies to determine a risk score to assess to each of the discovered AI assets.

Tools 244 are configured to execute a query/action, in response to a structured call, and return a result. Once tool 244 executes the query/action, e.g., run Python, search documents, query APIs, and subsequently, returns a result, the result is re-ingested by the reasoning model 240 along with the prior context, allowing the reasoning model 240 to update its internal thought state and thus, synthesize a final answer. The reasoning model 240 is further configured to generate a final response based on the initial reasoning produced by the reasoning model 240 and the result of one or more interactions with tools 244. In at least one embodiment, this thought-reasoning-action-response cycle of the reasoning model 240 may repeat multiple times if the problem requires iterative reasoning and/or the use of multiple tools 244.

Figure 5:
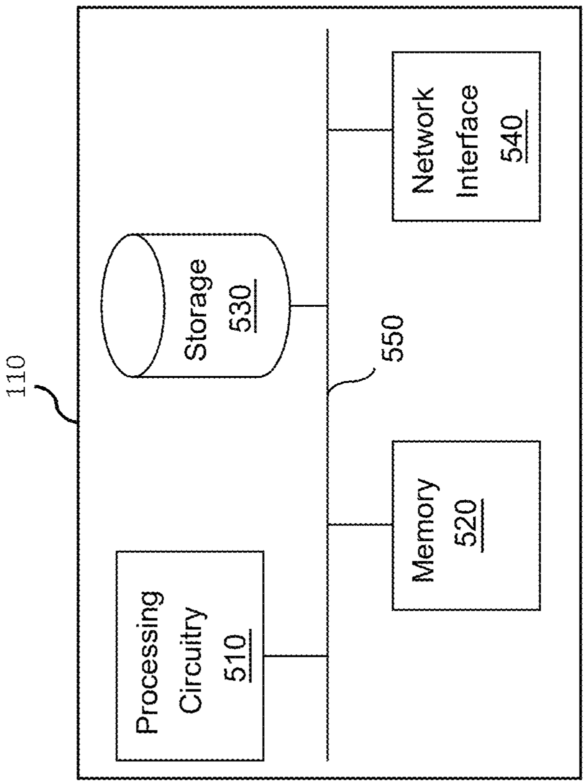
FIG. 5 is a block diagram of a computing architecture of an end-to-end AI asset protection system according to at least one embodiment.

It should be noted that the end-to-end AI asset protection system 110 and any of its modules 210, 220, and layers 240, 242 may be realized as a piece of software code. An end-to-end AI asset protection system 110 may be realized often as just-in-time compiled software code. As used herein, the term "software" refers to one or more sequences of instructions, logic, or routines, including but not limited to source code, object code, intermediate code, interpretable code, or executable code, that may be stored on a non-transitory computer-readable medium and executed by one or more processors. The software may be implemented using one or more machine learning frameworks, including but not limited to TensorFlow™, PyTorch™, ONNX™, or equivalent platforms. The software may be executed in virtualized environments, such as containers or serverless architectures, or may be deployed via cloud infrastructure. The term "hardware" refers to one or more physical computing devices or components capable of performing operations, including model training, inference, and/or data processing. Non-limiting examples of hardware include: Central Processing Units (CPUs); Graphics Processing Units (GPUs); Tensor Processing Units (TPUs); Application-Specific Integrated Circuits (ASICs); Field Programmable Gate Arrays (FPGAs); Neural Processing Units (NPUs) or equivalent dedicated AI accelerators; On-device microcontrollers or edge processors capable of running trained models, and the like. The described embodiments are not limited to any particular implementation platform and may be deployed across heterogeneous environments comprising combinations of the above. An example hardware layer implementation of the end-to-end AI asset protection system 110 in hardware is shown in FIG. 5.

Figure 3:
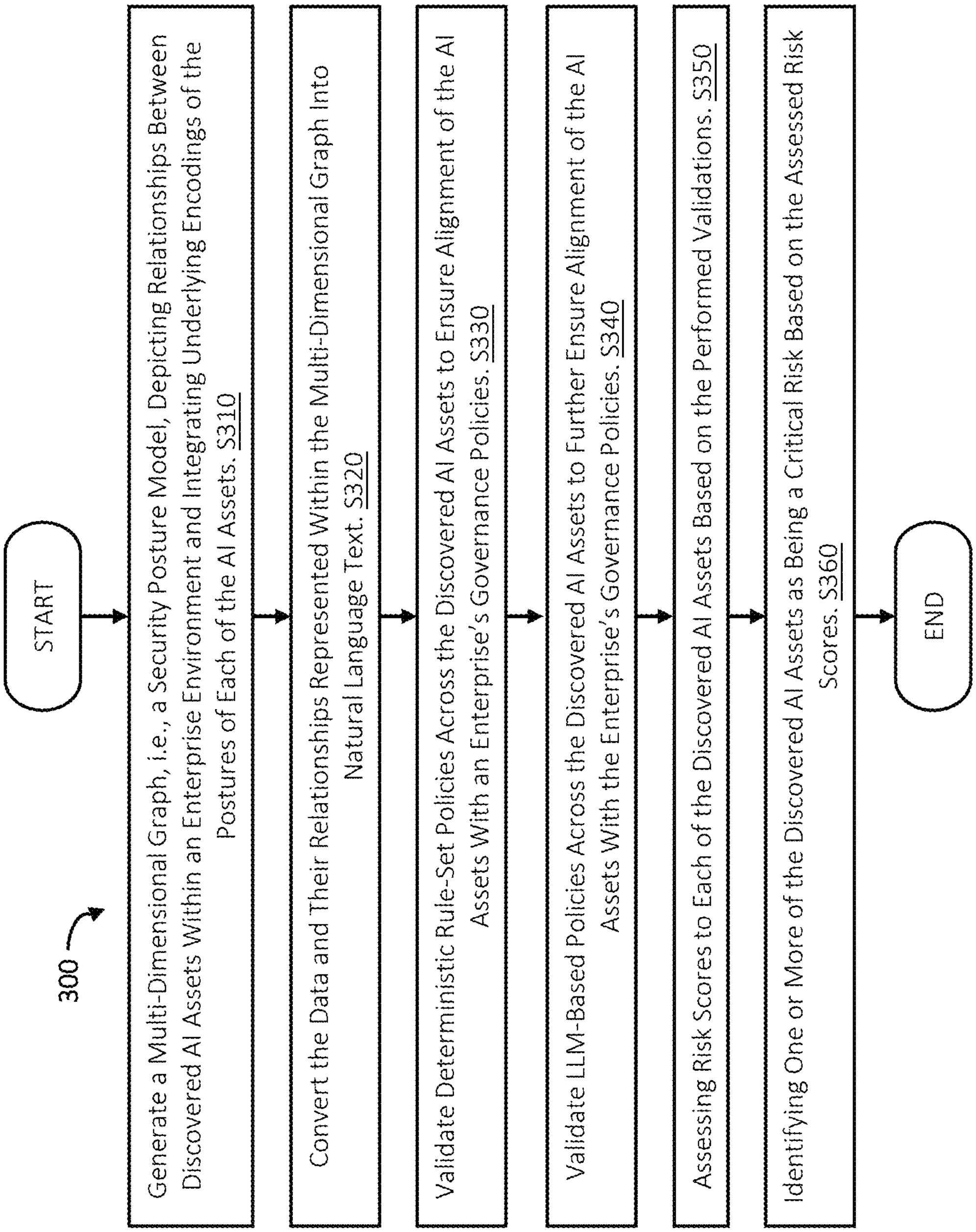
FIG. 3 is an operational flowchart illustrating a process for end-to-end AI asset posture management according to at least one embodiment.

FIG. 3 is an operational flowchart diagram illustrating a method 300, also referred to as process 300, for end-to-end AI asset posture management according to at least one embodiment. In some embodiments, the method may be performed by a system, such as the end-to-end AI asset protection system 110 shown in FIGS. 1 and 2. The method is executed to analyze, represent, and manage the security and compliance postures of all AI assets across an enterprise environment 100. The method will be discussed with reference to the elements shown in FIGS. 1 and 2.

Prior to S310, data is collected from platforms 130 within an enterprise environment 110 through various connections. As previously stated, data, such as metadata, runtime data, and configuration and system data, are ingested from platforms 130 through various read-only integrations, telemetry, and the like. Additionally, prior to S310, all AI assets within an enterprise environment 100 are discovered and identified, and are herein referred to as discovered AI assets and AI assets.

At S310, a multi-dimensional graph depicting the relationships between discovered AI assets within the enterprise environment 100 and integrating underlying encodings of the posture of each of the discovered AI assets is generated, also referred to as a security posture model. In addition to illustrating a visual representation of the relationships between the discovered AI assets, the multi-dimensional graph can include encodings of the postures of each of the AI assets. The collected data can be processed through data processing engine 210. Subsequently, the processed collected data can be fed through the posture management engine 220 into graph-based model 224. The graph-based model 224 can analyze the processed collected data by representing the processed collected data across multiple dimensions, i.e., modeling the relationships between the discovered AI assets represented in the processed collected data, and integrating underlying encodings of the posture of each of the discovered AI assets represented in the processed collected data, thus generating the multi-dimensional graph.

At S320, the data and their relationships represented within the multi-dimensional graph are converted into natural language text. Specifically, the generated multi-dimensional graph can be fed further through the posture management engine 220 into LLM 228. The LLM 228 can analyze the data represented within the multi-dimensional graph, i.e., data/metadata representing the discovered AI assets and their relationships, such as its nodes, edges, weights, attributes, encodings, etc., to generate a textual representation of the graph, i.e., a textual explanation/summary of the multi-dimensional graph's contents.

At S330, deterministic rule-set policies, within an enterprise's governance policies, are validated across the discovered AI assets to ensure alignment of the discovered AI assets with the enterprise's governance policies. The LLM 228 can feed the textual representation of the multi-dimensional graph into the deterministic rules engine 208. The deterministic rules engine 208 can validate the enterprise's deterministic rule-set policies, part one of the posture analysis, by applying predefined rules to the data represented in the text within the textual representation of the multi-dimensional graph. During the validation process, it is established whether one or more of the discovered AI assets circumvent, contradict, or weaken one of the deterministic rule-set policies, such as by misunderstanding, indirect exploitation, or architectural bypass. Based on the performed validation, the deterministic rules engine 208 can determine whether each of the discovered AI assets poses, or potentially could pose, any security and/or compliance risks, e.g., misconfigurations, overexposed connections, ungoverned data flows, policy violations, risky tool combinations, open channels, and the like.

At S340, LLM-based policies, within an enterprise's governance policies, are validated across the discovered AI assets to further ensure alignment of the AI assets with the enterprise's governance policies. Upon validating the enterprise's deterministic rule-set policies, the deterministic rules engine 208 can further feed the textual representation of the multi-dimensional graph, as well as feed the results of the validation of the deterministic rule-set policies, into the context "prompt" generator 230. The context" prompt" generator 230 queries one or more context resources 232 to access information, such as information learned through historical data or learned information through the most recent analyzed data, needed to generate contextually relevant prompts corresponding to validating the LLM-based policies across the discovered AI assets to further ensure alignment with the enterprise's governance policies. Using information pulled from the context resources 232, along with a pre-defined system prompt, the context "prompt" generator 230 generates a contextually relevant prompt. The context "prompt" generator 230 feeds the system prompt, the generated contextually relevant prompt, the results of the validation of the deterministic rule-set policies, and the textual representation of the generated multi-dimensional graph, to the reasoning model 240 for processing.

The reasoning model 240 can validate the enterprise's LLM-based policies across the discovered AI assets by analyzing the system prompt, the generated contextually relevant prompt, and the textual representation of the multi-dimensional graph. The reasoning model 240 can validate the enterprise's LLM-based policies, part two of the posture analysis, by analyzing the data represented in the text within the textual representation of the multi-dimensional graph, such as by mapping potential attack paths and evaluating the effectiveness of existing security controls using its reasoning. During the validation process, it is established whether one or more of the discovered AI assets circumvent, contradict, or weaken one of the LLM-based policies, such as by bypassing an LLM's ethical/safety constraints through prompt injection. Based on the performed validation, the reasoning model 240 can further determine whether each of the AI assets poses, or potentially could pose, any security and/or compliance risks, e.g., misconfigurations, overexposed connections, ungoverned data flows, policy violations, risky tool combinations, open channels, and the like.

At S350, risk scores are assessed to each of the discovered AI assets based on the performed validations. A risk score can be a numerical representation, from one (1) to ten (10), indicating the likelihood that an AI asset presents, or will present, one or more security risks and/or one or more compliance risks. The risk score can include an overall final risk score, as well as the sub-components of the risk score and how each sub-component contributed to the final risk score. Specifically, the results of the performed validations can be analyzed, using the reasoning model 240, to determine a risk score to assess to each of the discovered AI assets, using the following formula:

$$\text{Risk Score} = \text{Impact On Enterprise Score} \times \text{Probability of Impact Happening Score}$$

The impact on enterprise score can be impacted by various determinations related to the extent of damages or impact that incident(s) can cause within an enterprise, i.e., the blast radius, such as how much the impact will actually affect the data the AI asset is connected to, what users the AI asset is connected to, if the AI asset is part of one or more critical processes, etc. The probability of the impact happening score can be impacted by various determinations related to a higher probability of being attacked, such as an AI asset being hosted on a website located in a certain country, an AI asset that is publicly exposed, if you could send the AI asset an email, a combination of etc. For example, if an AI asset is connected to sensitive data and can be sent an email, both the impact on enterprise score and the probability of impact happening score would be greater, and thus, the risk score would be as well.

At S360, one or more discovered AI assets are identified as being a critical risk based on their assessed risk scores. A discovered AI asset is identified as being a critical risk upon being assessed a risk score of a certain number or greater than a certain number, as defined by each enterprise, i.e., the enterprise's risk tolerance. For example, an enterprise could set that being assessed: (1) a risk score of 7.8 and above qualifies an AI asset as being a critical risk; (2) a risk score between 7.8 and 3 qualifies an AI asset as being neutral; and (3) a risk score of 3 and below qualifies an AI asset as being a low risk. Upon being identified as a critical risk, it is confirmed that one or more security and/or compliance risks exist relating to the corresponding one or more AI assets, and that remediation of those risks should be performed.

In at least one embodiment, AI asset posture management 300 runs continuously. In at least one embodiment, AI asset posture management 300 runs on a schedule. In at least one embodiment, AI asset posture management 300 is retriggered by new events.

Although FIG. 3 shows example blocks of the method 300, in some implementations, process 300 may include additional blocks, fewer blocks, different blocks, or differently arranged blocks than those depicted in FIG. 3. Additionally, or alternatively, two or more of the blocks of process 300 may be performed in parallel.

FIG. 5 is an example block diagram of a computing architecture of the end-to-end AI asset protection system 110.

The end-to-end AI asset protection system 110 includes a processing circuitry 510 coupled to a memory 520, a storage 530, and a network interface 540. In an embodiment, the components may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing units (GPUs), system-on-a-chip systems (SOCs), general-purpose microprocessors, microcontrollers, digital signal processors (DSPs), and the like, or any other hardware logic components that can perform calculations or other manipulations of information.

In at least some embodiments, the processing circuitry 510 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 510 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In embodiments that utilize large language models (LLMs) or otherwise perform operations which may require or be enhanced through the use of parallel processing, the processing circuitry 510 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors during attention weight computation. In at least some such embodiments using GPUs, the processing circuitry 510 may include a number of CPU cores which is equal to or greater than the number of GPUs in order to facilitate or otherwise support parallel processing via multiple GPUs.

The memory 520 may be volatile (e.g., RAM, etc.), non-volatile (e.g., ROM, flash memory, etc.), or any combination thereof. In one configuration, computer-readable instructions needed to implement one or more embodiments disclosed herein may be stored in the storage 530.

In another embodiment, the memory 520 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), hard drives, SSD, or any other medium which can be used to store the desired information, such as log of transactions, public keys, and so on. The storage 530 may include code for executing end-to-end AI asset posture management.

The network interface 540 allows the end-to-end AI asset protection system 110 to communicate with the Internet or a local area network. The network interface 540 communicates with these elements.

It should be understood that the embodiments described herein are not limited to the specific architecture illustrated in FIG. 5 and that other architectures may be equally used without departing from the scope of the disclosed embodiments.

It should be further noted that the end-to-end AI asset protection system 110 may be realized using a computing architecture similar to the architecture illustrated in FIG. 5, but that other architectures may be equally used without departing from the scope of the disclosed embodiments. Further, the memory 520 may include instructions for executing the function of the respective device.

The various embodiments disclosed herein can be implemented as any combination of hardware, firmware, and software. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a micro-instruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the groups consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for analyzing, representing, and managing security and compliance posture of artificial intelligence (AI) assets within an enterprise computing environment, comprising:

ingesting, by a data processing engine via read-only platform integrations and telemetry interfaces configuration data, runtime data, and connectivity data associated with a plurality of discovered AI assets across one or more enterprise platforms;

generating, using a trained graph-based model, a multi-dimensional graph data structure that models the discovered AI assets and relationships among the discovered AI assets, wherein the multi-dimensional graph data structure comprises encoded security and compliance posture attributes for each of the discovered AI assets;

converting, using a trained large language model (LLM), data and relationships represented within the multi-dimensional graph data structure into natural language text;

validating, by executing a deterministic rules engine, deterministic rule-set policies of enterprise governance policies using data represented in the natural language text;

generating, by a context prompt generator that queries one or more context resources, a contextually relevant prompt corresponding to validating LLM-based policies of the enterprise governance policies;

validating, by executing a trained reasoning model, the LLM-based policies using the contextually relevant prompt, the natural language text, and results of validating the deterministic rule-set policies;

computing, based on the validations, a security risk score and a compliance risk score for each of the discovered AI assets;

assigning a critical security risk designation to a discovered AI asset when the security risk score satisfies a criticality criterion and a critical compliance risk designation to the discovered AI asset when the compliance risk score satisfies a criticality criterion; and responsive to a detected change in the multi-dimensional graph data structure, the detected change being based on the ingested data and corresponding to at least one of runtime behavior, configuration state, and connectivity of at least one of the discovered AI assets, retriggering at least the generating, converting, validating, computing, and assigning steps to update the security risk score and the compliance risk score and corresponding criticality designations for the at least one discovered AI asset.

2. The method of claim 1, wherein the generated multi-dimensional graph encodes heterogeneous node types corresponding to at least AI agents, AI tools, data sources, access channels, and enterprise platforms, and heterogeneous edge types corresponding to data flows, tool invocations, trust relationships, and policy dependencies.

3. The method of claim 1, wherein the encoded security and compliance posture attributes comprise at least one of configuration parameters, permission scopes, exposure levels, data sensitivity indicators, policy enforcement states, or residual risk indicators.

4. The method of claim 1, wherein the generated multi-dimensional graph data structure is maintained as a non-visual operational data structure used for automated traversal and inference, and wherein the ingesting further comprises, by the data processing engine:

executing one or more operations on the ingested configuration data, runtime data, and connectivity data comprising filtering, sorting, and aggregating to prepare posture information for generating the multi-dimensional graph data structure.

5. The method of claim 1, further comprising:

responsive to assigning, to a discovered AI asset, one or both of (i) a critical security risk designation and (ii) a critical compliance risk designation, generating an enforcement directive identifying the discovered AI asset, at least one enterprise governance policy implicated by the assigned designation, and one or more control objectives for directing governance-policy enforcement across the enterprise network.

6. The method of claim 1, wherein the validating of the deterministic rule-set policies and the validating of the LLM-based policies are automatically triggered by one or more detected changes in the generated multi-dimensional graph data structure.

7. The method of claim 1, wherein an AI asset comprises any one of: a tool, a data source, or another AI component used in development, deployment, or operation of an AI system.

8. The method of claim 1, wherein the validating of the deterministic rule-set policies or the validating of the LLM-based policies includes detecting policy violations arising from overexposed access channels, ungoverned tool combinations, or unauthorized data flows involving the discovered AI assets.

9. The method of claim 1, wherein validating the deterministic rule-set policies further comprises:

executing the deterministic rules engine that applies machine-enforceable policy constraints by applying predefined rules to data represented in the natural language text generated from the multi-dimensional graph data structure.

10. The method of claim 9, wherein the enterprise governance policies comprise security policies, compliance policies, and operational policies, including deterministic rule-set policies validated by the deterministic rules engine and LLM-based policies validated by the trained reasoning model.

11. The method of claim 1, wherein computing the security risk score and the compliance risk score for each of the discovered AI assets further comprises:

aggregating posture and compliance states inferred through traversal of the generated multi-dimensional graph data structure, wherein the computed security risk score and the compliance risk score reflect a potential blast radius determined from downstream data flows and tool dependencies represented in the generated multi-dimensional graph data structure.

12. A system for analyzing, representing, and managing security and compliance posture of artificial intelligence (AI) assets within an enterprise computing environment, comprising:

one or more processors configured to:

ingest, by a data processing engine via read-only platform integrations and telemetry interfaces configuration data, runtime data, and connectivity data associated with a plurality of discovered AI assets across one or more enterprise platforms;

generate, using a trained graph-based model, a multi-dimensional graph data structure that models the discovered AI assets, access channels, and relationships among the discovered AI assets, wherein the multi-dimensional graph data structure comprises encoded security and compliance posture attributes for the discovered AI assets;

convert, using a trained large language model (LLM), data and relationships represented within the multi-dimensional graph data structure into natural language text;

validate, by executing a deterministic rules engine, deterministic rule-set policies of enterprise governance policies using data represented in the natural language text;

generate, by a context prompt generator that queries one or more context resources, a contextually relevant prompt corresponding to validating LLM-based policies of the enterprise governance policies;

validate, by executing a trained reasoning model, the LLM-based policies using the contextually relevant prompt, the natural language text, and results of validating the deterministic rule-set policies;

compute, based on the validations, a security risk score and a compliance risk score for each of the discovered AI assets;

assign a critical security risk designation to a discovered AI asset when the security risk score satisfies a criticality criterion and a critical compliance risk designation to the discovered AI asset when the compliance risk score satisfies a criticality criterion; and responsive to a detected change in the multi-dimensional graph data structure, the detected change being based on the ingested data and corresponding to at least one of runtime behavior, configuration state, and connectivity of at least one of the discovered AI assets, retriggering at least the generating, converting, validating, computing, and assigning steps to update the security risk score and the compliance risk score and corresponding criticality designations for the at least one discovered AI asset.

13. The system of claim 12, wherein the generated multi-dimensional graph encodes heterogeneous node types corresponding to at least AI agents, AI tools, data sources, access channels, and enterprise platforms, and heterogeneous edge types corresponding to data flows, tool invocations, trust relationships, and policy dependencies.

14. The system of claim 12, wherein the encoded security and compliance posture attributes comprise at least one of configuration parameters, permission scopes, exposure levels, data sensitivity indicators, policy enforcement states, or residual risk indicators.

15. The system of claim 12, wherein the generated multi-dimensional graph data structure is maintained as a non-visual operational data structure used for automated traversal and inference, and wherein the ingesting further comprises, by the data processing engine:

executing one or more operations on the ingested configuration data, runtime data, and connectivity data comprising filtering, sorting, and aggregating to prepare posture information for generating the multi-dimensional graph data structure.

16. The system of claim 12, further comprising:

responsive to assigning, to a discovered AI asset, one or both of (i) a critical security risk designation and (ii) a critical compliance risk designation, generating an enforcement directive identifying the discovered AI asset, at least one enterprise governance policy implicated by the assigned designation, and one or more control objectives for directing governance-policy enforcement across the enterprise network.

17. The system of claim 12, wherein the validating of the deterministic rule-set policies and the validating of the LLM-based policies are automatically triggered by one or more detected changes in the generated multi-dimensional graph data structure.

18. The system of claim 12, wherein the validating of the deterministic rule-set policies or the validating of the LLM-based policies includes detecting policy violations arising from overexposed access channels, ungoverned tool combinations, or unauthorized data flows involving the discovered AI assets.

19. The system of claim 12, wherein validating the deterministic rule-set policies further comprises:

executing the deterministic rules engine that applies machine-enforceable policy constraints by applying predefined rules to data represented in the natural language text generated from the multi-dimensional graph data structure.

20. The system of claim 12, wherein an AI asset comprises any one of: a tool, a data source, or another AI component used in development, deployment, or operation of an AI system.

21. The system of claim 19, wherein the enterprise governance policies comprise security policies, compliance policies, and operational policies, including deterministic rule-set policies validated by the deterministic rules engine and LLM-based policies validated by the trained reasoning model.

22. The system of claim 12, wherein computing the security risk score and the compliance risk score for each of the discovered AI assets further comprises:

aggregating posture and compliance states inferred through traversal of the generated multi-dimensional graph data structure, wherein the computed security risk score and the compliance risk score reflect a potential blast radius determined from downstream data flows and tool dependencies represented in the generated multi-dimensional graph data structure.

23. A non-transitory computer-readable medium storing a set of instructions for analyzing, representing, and managing security and compliance posture of artificial intelligence (AI) assets within an enterprise computing environment, the set of instructions comprising:

one or more instructions that, when executed by one or more processors of a device, cause the device to:

ingest, by a data processing engine via read-only platform integrations and telemetry interfaces configuration data, runtime data, and connectivity data associated with a plurality of discovered AI assets across one or more enterprise platforms;

generate, using a trained graph-based model, a multi-dimensional graph data structure that models the discovered AI assets and relationships among the discovered AI assets, wherein the multi-dimensional graph data structure comprises encoded security and compliance posture attributes for the discovered AI assets;

convert, using a trained large language model (LLM), data and relationships represented within the multi-dimensional graph data structure into natural language text;

validate, by executing a deterministic rules engine, deterministic rule-set policies of enterprise governance policies using data represented in the natural language text;

generate, by a context prompt generator that queries one or more context resources, a contextually relevant prompt corresponding to validating LLM-based policies of the enterprise governance policies;

validate, by executing a trained reasoning model, the LLM-based policies using the contextually relevant prompt, the natural language text, and results of validating the deterministic rule-set policies;

compute, based on the validations, a security risk score and a compliance risk score for each of the discovered AI assets;

assign a critical security risk designation to a discovered AI asset when the security risk score satisfies a criticality criterion and a critical compliance risk designation to the discovered AI asset when the compliance risk score satisfies a criticality criterion; and responsive to a detected change in the multi-dimensional graph data structure, the detected change being based on the ingested data and corresponding to at least one of runtime behavior, configuration state, and connectivity of at least one of the discovered AI assets, retriggering at least the generating, converting, validating, computing, and assigning steps to update the security risk score and the compliance risk score and corresponding criticality designations for the at least one discovered AI asset.

* * * * *